United States Patent [19]

Bohnlein

[11] 4,084,554

[45] Apr. 18, 1978

[54] MULTI-CYLINDER INTERNAL COMBUSTION ENGINE

[76] Inventor: Horst Böhnlein, Friedhofstrasse 4, 6651 Altenkirchenuber Waldmohr, Germany

[21] Appl. No.: 516,734

[22] Filed: Oct. 21, 1974

[30] Foreign Application Priority Data

Apr. 11, 1974 Germany ............................. 2417679
Sep. 5, 1974 Germany ............................. 2442448

[51] Int. Cl.² ........................................... F02B 75/18
[52] U.S. Cl. ........................ 123/52 MF; 123/188 C; 123/193 CH
[58] Field of Search ...... 123/188 VA, 188 C, 52 MF, 123/55 VE, 142, 189, 193 CH, 193 H

[56] References Cited

U.S. PATENT DOCUMENTS

| | | | |
|---|---|---|---|
| 1,868,138 | 7/1932 | Fisk | 123/188 VA |
| 2,250,446 | 7/1941 | Cowles | 123/193 CH |
| 2,337,982 | 12/1943 | Ericson | 123/52 MF |
| 2,491,630 | 12/1949 | Voorhies | 123/193 CH |
| 2,787,992 | 4/1957 | Funt | 123/188 VA |
| 3,810,454 | 5/1974 | Hunt | 123/52 MF |
| 3,824,965 | 7/1974 | Clawson | 123/32 ST |

FOREIGN PATENT DOCUMENTS

| | | | |
|---|---|---|---|
| 656,439 | 5/1929 | France | 123/189 |
| 573,686 | 11/1945 | United Kingdom | 123/188 S |

*Primary Examiner*—Charles J. Myhre
*Assistant Examiner*—Craig R. Feinberg
*Attorney, Agent, or Firm*—Martin A. Farber

[57] ABSTRACT

A multi-cylinder internal combustion engine with at least one carburettor, and at least one intake manifold coordinated to the latter as well as to the cylinder, and a cam control by which the inlet valves open only after the closing of the outlet valves. A device is provided which seals the inlet valve at the cylinder head on the inlet side, and at least one flutter valve is disposed in the intake manifold coordinated to each cylinder or cylinder pair, and a fuel outlet of the carburettor is regulatable from a nozzle.

4 Claims, 9 Drawing Figures

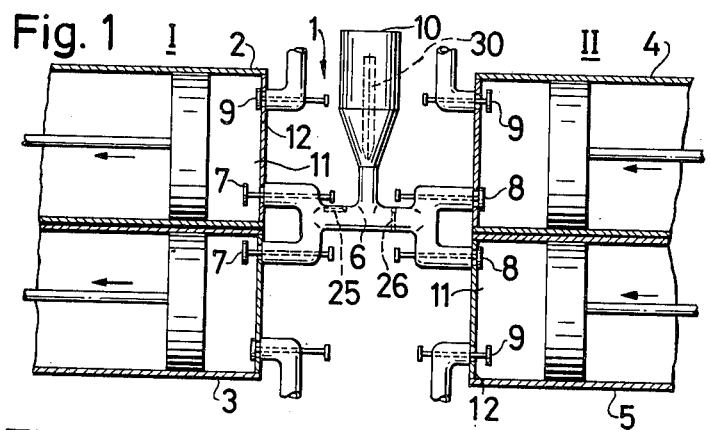
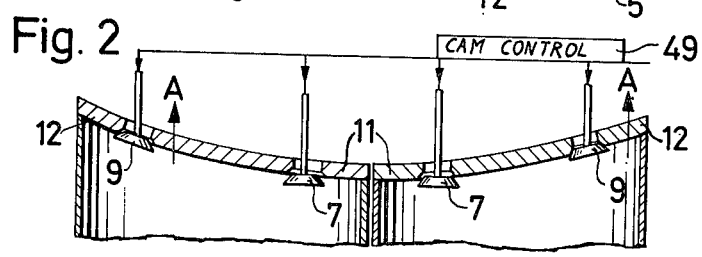
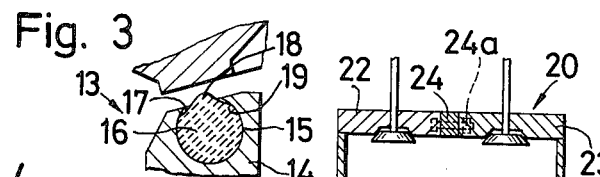
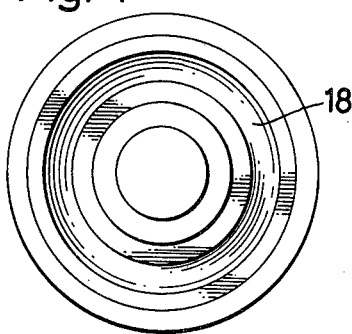
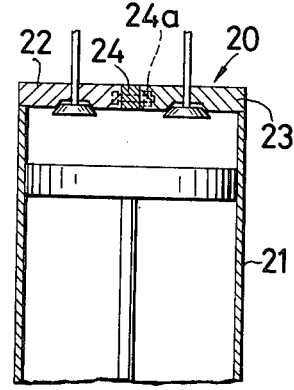

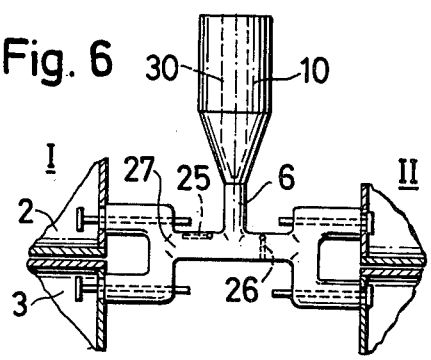
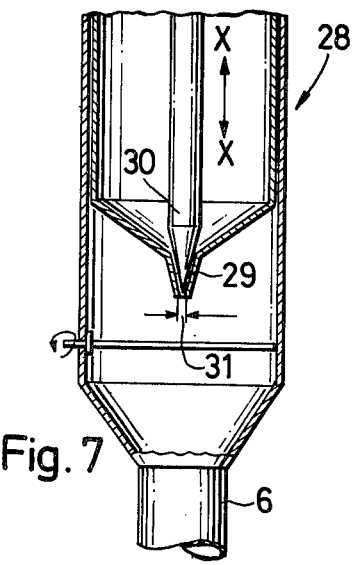
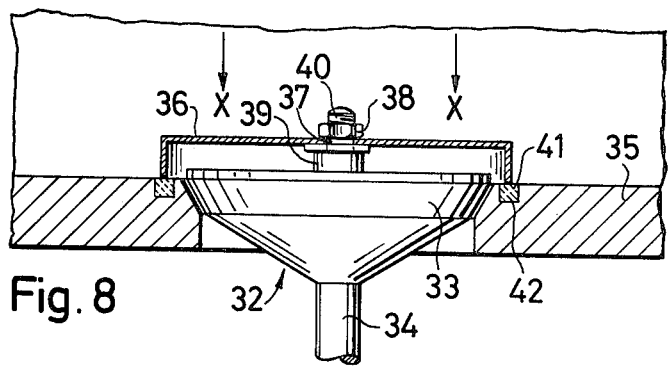
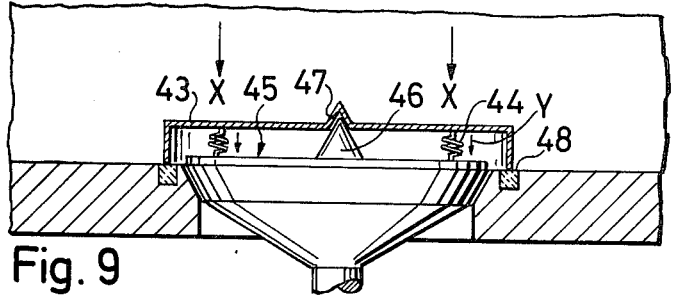

MULTI-CYLINDER INTERNAL COMBUSTION ENGINE

The invention relates to a multi-cylinder internal combustion engine with at least one carburettor, and in particular concerns arrangements in the carburettor region of the cylinder block and cylinder head which in addition to a considerable increase in output or performance of the motor, considerably lowers the fuel consumption, and among other things reduces the harmful exhaust gases to a minimum.

In addition to a series of already known, comparatively expensive devices having excessive apparatus, as well as methods for the increase in efficiency of multi-cylinder internal combustion engines, as well as for the reduction of injurious exhaust gases, it has been proposed, as relatively simple and inexpensive measures for raising of the output as well as economizing of fuel and avoiding of overheating, as well as reduction of the monoxide content in the exhaust gases, to control the valves of the cylinder of a motor vehicle in such a manner that the inlet valve is opened only after the closing of the outlet valve. This is disadvantageous in that a series of factors were not considered, which factors, for the relevant important improvements to an internal combustion engine with a plurality of cylinders and at least one carburettor, are still indispensable, such as, for example, the complete sealing of the inlet valves, the elimination of the turbulence in the intake manifold respectively between the carburettor and the inlet valves, as well as the achievement of the stoichiometrical equilibrium over the entire driving range and rotating speed range, respectively. With a four cylinder internal combustion engine with a common intake manifold, the two cylinders of one cylinder side suck or draw-in the air-gas mixture away from the carburettor over their inlet valves, while the two cylinders of the other cylinder side burn the already drawn in, compressed mixture, and discharge it through the respective outlet valve. Thereby, as a result of the leakage of the inlet valve, to be exemplified later, a part of the burning air-gas mixture to be discharged is pressed back through the unsealed inlet valve and produces a compression or pressure wave arising thereby in the intake manifold in the direction toward the two other cylinders, the suction pressure toward the direction of the other cylinder pair necessarily increases (which naturally holds also in the reverse case), so that an increase in performance of the motor arises by this compressor effect. This increase in performance at the expense of the unsealed inlet valve and the combustion gases which in this manner have penetrated in the intake manifold bring about a considerable rise in temperature of the motor by the combustion occurring in the intake manifold. This combustion is present if the suction "(or inlet valve) opens before OT (the upper" gate point, i.e., the maximum height of the piston stroke in the cylinder). This always occurs if the inlet valve leaks. The leakage of the inlet valve is, as known, dependent on the excessively high temperature difference between the inlet side and outlet side, and the forces or stresses occurring thereby on the upper side of the cylinder head, the result of which is a bending upwards thereof. Over the outlet valves, due to the very hot discharged combustion gases which occur during the running of the motor, the outlet side of the cylinder head is exposed to extremely high temperatures; in contrast thereto, the inlet side is cooled by the comparatively cool air-gas mixture flowing in the inlet valves, whereby the stress occurs on the entire surface of the cylinder head. Since the outlet valves now, are at annealing temperature, the valve seat and valve head deform such that they constantly remain tight, i.e., sealed. (Herein "sealed" means that the valve is closed tight without leakage when in its normally operatively closed position). On the other hand, the substantially cooler inlet side, due to the stress in the surface of the cylinder head likewise deforms in the same manner as the outlet side, and bends upwardly together with the cylinder head, respectively, and does not completely seal, since as a result of the substantially lower temperature relative to the outlet valves, the inlet valve heads are not so extensively deformed so as to adjust and seal satisfactory. Due to this leakage, with closed inlet valves, the flames strike into the intake space and the intake manifold, respectively, and simultaneously under pressure by the combustion in the cylinder, escape in the intake manifold. These flames ignite burnable residual parts in the intake manifold of one cylinder side. Aside from other disadvantageous operating phenomena, the ideal condition with an internal combustion engine, that is namely, the stoichiometrical equilibrium (i.e., for the optimal combustion and thus for the achievement of the optimum efficiency, for a determined fuel quantity, a fixed quantity of air must be present, e.g., for 1 part fuel = 14 parts air), can not be achieved with the conventional intake devices. Although by the leakage of the inlet valves, indeed there is present an apparent increase in performance of the motor, this still is limited by the thus connected high rise in temperature of the motor. The turbulence present through the inlet valves, which indeed necessarily leads to the increase in performance, does not maintain (according to that which has already been set forth) the stoichiometrical equilibrium over the entire driving range. Furthermore the qualtity of the harmful exhaust gases is relatively large.

It is an object and task of the invention, starting out from the known state of the art, according to which by corresponding control of the valves, merely a partial success occurs in the increasing the efficiency and combating the harmful exhaust gases and the like, now with the invention to make provisions to insure that the stoichiometrical equilibrium can be produced with an internal combustion engine over the entire driving range, in order in this manner to achieve an optimal motor performance with little fuel consumption and low engine temperature, as well as a most extensive elimination of the harmful waste gases.

This is made possible by, and it is another object in accordance with the invention to provide, a multi-cylinder internal combustion engine with at least one carburettor and at least one intake manifold coordinated to the latter as well as to the cylinder, and a cam control by which the inlet valves open only after the closing of the outlet valves, which is characterized by the following arrangement:

1. that at the cylinder head on the inlet side, an unobjectionable sealing of the inlet valve, by corresponding means, is possible;
2. that in the intake manifold there is provided at least one valve coordinated to each cylinder (or to each cylinder pair); and that
3. the motor has a carburettor with a fuel outlet, which outlet is regulatable from the nozzle.

It is still another object of the present invention to provide a multi-cylinder internal combustion engine in accordance with the above-mentioned objectives, wherein further, the inlet valve includes a valve seat ring in the cylinder head having an annular groove cut therein; a non-burnable filler fills the annular groove cut and the filler is a substance which expands at high temperature, and for example may be graphite, or a combination of asbestos and graphite.

It is still another object of the present invention to provide a multi-cylinder internal combustion engine in accordance with the above-mentioned objectives, wherein further, the annular groove cut is undercut to prevent the filler from falling out.

It is still another object of the present invention to provide a multi-cylinder internal combustion engine in accordance with the above-mentioned objectives, wherein further, the cylinder head of one of the cylinders is divided into two parts between the inlet side and the outlet side thereof, respectively; a steel sheet is intermediately positioned between the two parts; and a screw means connects the steel sheet and the two parts together to a unit in such a manner that the two parts are longitudinally displaceable relative to each other.

It is still another object of the present invention to provide a multi-cylinder internal combustion engine in accordance with the above-mentioned objectives, wherein further, the inlet manifold is subdivided into a plurality of short time-closeable individual spaces by the at least one valve, which valve constitutes at least one check valve for preventing a reverse flow and for closing the individual spaces for the short time correspondingly to the closing of the corresponding coordinated inlet valve. The check valve advantageously may be a flutter or flap valve.

It is still another object of the present invention to provide a multi-cylinder internal combustion engine in accordance with the above-mentioned objectives, wherein further, a nozzle pin is axially displaceably disposed in the carburettor, and has an end range which is operatively guided in the nozzle opening. Advantageously the end range is conically tapered toward its free end. Further, the nozzle opening and the nozzle pin are formed such that at full load, and at each adjustment position of the pin relative to the opening, respectively, the correct air-gas mixture for the stoichiometrical equilibrium is provided.

It is still another object of the present invention to provide a multi-cylinder internal combustion engine in accordance with the above-mentioned objectives, wherein further, the inlet valve comprises a valve head and a valve seat having a valve head support surface; a sealing bell covering the valve head is connected therewith, the sealing bell having a lower edge which in a closing position of the valve is sealingly supported on the valve head support surface and the valve seat, respectively. The sealing bell may be operatively pivotally connected with the valve head.

It is still another object of the present invention to provide a multi-cylinder internal combustion engine in accordance with the above-mentioned objectives, wherein further, the sealing bell is operatively pivotally connected with the valve head and is formed such that it presses in the direction on the valve head support surface.

Only by achieving obtaining of the stoichiometrical equilibrium are the exhaust gases purified. Actually the stoichiometrical equilibrium is realized only in cooperative combination with 1) the controlling of the turbulence and with 2) the prevention of the leakage of the inlet valves, as well as with 3) the regulation of the carburettor nozzle fuel outlet opening. All the heretofore set forth advantages can only be achieved by attaining of the stoichiometrical equilibrium, which depends in turn on the control of the turbulence and the prevention of the leakage of the inlet valves. Each feature depends cooperatively on the others. Thus the nozzle control, the valves in the intake manifold and the sealing means of the inlet valves in accordance with the invention cooperatively function to produce the exceptional engine operation, performance and advantages set forth hereinbefore.

With the above and other objects in view, the invention, including further features and advantages thereof, will become more clearly understood, in connection with the following detailed description of a preferred embodiment of the invention as illustrated in the drawings, in which:

FIG. 1 is a schematic longitudinal cross-sectional view, partly broken away, of a four cylinder block with each two cylinder pairs and an intake manifold connecting the latter at one side thereof with a carburettor;

FIG. 2 is a fragmentary sectional view of a cylinder pair showing the cylinder head with inlet valves and outlet valves;

FIG. 3 is a partial cross-sectional view of an inlet valve in accordance with the invention which may be used with FIG. 1;

FIG. 4 is a plan view of the valve seat ring according to FIG. 3;

FIG. 5 is a longitudinal cross-sectional view, partly broken away, showing another embodiment of the invention having a cylinder head which is divided between the inlet side and the outlet side;

FIG. 6 is a longitudinal cross-sectional view of an arrangement of two flutter valves in an intake manifold, the respective cylinder pairs being broken away in part;

FIG. 7 is a partially broken away enlarged longitudinal section of a carburettor with a nozzle regulating the fuel outlet;

FIG. 8 is an elevational view of another embodiment of a valve in accordance with the invention showing a valve with a sealing bell, in schematic illustration, and showing the corresponding valve with valve plunger partially broken away, as well as the corresponding valve seat in longitudinal section; and FIG. 9 is an elevational view corresponding to FIG. 8 of another embodiment of a valve with a sealing bell with spring pretensioning.

Referring now to FIGS. 1 and 2, a four cylinder block comprises, each a cylinder pair I and II, the individual cylinders 2, 3 and 4, 5, respectively of which, are connected with each other by a common intake manifold 6 on one-side with the inlet valves 7 and 8, respectively. A cam control 49, schematically illustrated, opens the inlet valves only after the closing of the outlet valves, as is known. As soon as the cylinder 2 sucks in an air-gas mixture via its inlet valve 7, the inlet valve 7 of the cylinder 3 opens, while the cylinders 4 and 5 expel the combusted air-gas mixture through the outlet valves 9. As a consequence of the leakage of the inlet valves, as mentioned in the introduction of the specification simultaneously, combustion gases are forced through the inlet valves 8 in the intake space and the intake manifold 6 respectively, which operating as a compressor force the gas mixture coming from a carburettor 10 through the open inlet valves 7 of the cylinders 2, 3 into the inner spaces thereof. This occurrence is also present in the reversed valve opening sequence and valve closing sequence. By means of this additional thrust, instantaneously, the performance of the motor is increased; but because of, the combustion, which necessarily occurs in the intake manifold, the motor becomes very hot so that the increase in efficiency is only limited, and in addition there occurs a high motor wear and tear which is conditionally dependent on the heat. By the high difference in temperature, which, as described in the introduction, is present between the inlet side 11 and the outlet side 12 and the stresses or forces arising thereby in the cylinder head, the latter bends upwardly, as shown in exaggerated illustration in FIG. 2 for better understanding, so that the outlet side 12, and with this, the outlet valve 9 deforms in the arrow direction A. By the high temperature in the outer sides 12 as well as the pressure which highly loads the outlet valves 9, these press constantly together, such that they completely operatively seal. However, this is not the case with the substantially cooler inlet valves 7.

In order to correct this, in accordance with the present invention, for non-objectionably sealing the inlet valves 7 at the inlet sides of the cylinder heads, as one example a valve seat 13 is proposed, which, as shown in FIGS. 3 and 4, has an annular groove or cut 15 formed or milled in the valve seat ring 14, which is filled with a non-burnable material or filler 16, which expands at high temperature, and projects from the slit shaped opening 19 with a projecting end portion 18. For this purpose, the annular groove 15 advantageously is relief cut or under-cut; consequently the non-burnable filler 16 can not slide out of the annular groove. Usefully, graphite or a combination of asbestos and graphite is used as the non-burnable filler 16. By this projection 18 rising out of the annular groove, the valve seat moves together with the deforming cylinder head such that the inlet valve, with the aid of the projection, is always in operative contact or abutment connection with the valve head, and the inlet valve in this manner constantly remains sealed.

Referring now again to the drawings, and more particularly to FIG. 5, according to another embodiment of a non-objectionable inlet valve sealing to be used in the combination of the present invention, a cylinder head 20 of a cylinder 21 is divided into two parts between its inlet part 22 and its outlet part 23 and under the intermediate positioning of a steel plate or sheet 24, or the like, again is joined together as a unit, e.g. screwed together by screws and nuts 24a (illustrated schematically in dashed lines for convenience), so that the inlet part 22 can shift relative to the outlet part 23. In this manner, provision is made to insure that the valve seat of the inlet valve can no longer deform but rather continues to stay in its occupied normal position, so that in this case, an unobjectionable sealing is guaranteed also with a conventional valve.

By the complete sealing of the inlet valves, a back fire of the flames and a pressure return shock from the cylinders into the intake space and the intake manifold, respectively, is checked. In this manner, also the compressor effect is produced and turbulence in the intake manifold is neutralized, so that first of all the stoichiometrical equilibrium can be achieved over the entire range of the rotating speed. In this case, indeed, the performance of the motor goes down, yet simultaneously therewith, also the temperature of the motor is lowered quite considerably.

It was further found that the turbulence in the intake space can still be further reduced, when the space is held as small as possible, since with a large intake space, thus with long intake manifolds, the filling or charging gets lost in the large spaces, so that the performance of the motor is reduced. By subdivision of the intake manifold by means of a corresponding valve, (preferably a flutter or flap valve 25, 26 (FIG. 6), in several individual spaces) not only can the turbulence be quite considerably reduced, but furthermore also the air-fuel mixture can be substantially mixed better before entrance into the cylinder. The flutter valve thus has the purpose, during the intake of the fuel-air mixture from the carburettor into the cylinder block side I, to prevent residual air-fuel mixture from not being sucked off to the other cylinder block side II, or besides in any way being turbulently impaired. Accordingly, during intake, the flutter valve 25 opens the cylinders of the side I, as the air-gas mixture enters the inlet valves of the cylinders 2, 3, while the flutter valve 26 closes the other side II. In this manner there arises, toward each side respectively, a decisively better charging with air-fuel mixture. During intake of the side I, one side 27 of the intake manifold is completely sucked with the mixture over the intake part, while the other side is blocked off by the flutter valve 26. In this way the already drawn-in mixture can not flow or escape over the entire intake manifold, thus also toward the other side, and is prevented from distributing in the entire intake space; but rather the mixture remains in its full amount on the one side 27, for the intake into the cylinders 2, 3 in the cylinder block part I. It is yet to be mentioned that this however, only is applicable for a motor with only one carburettor and large intake manifold.

The flutter valves (25, 26) constitute check valves coordinated to each cylinder or each cylinder pair, respectively, preventing a reverse flow. The flutter valves open and close automatically by the directional flows in the intake manifold according to the opening and closing of the corresponding inlet valves, respectively, in short-timed periods.

With large intake spaces and long intake manifolds, respectively, for the improved thorough blending of the air-fuel mixture and for the improved stand-on engagement in front of the corresponding inlet valve or valves various flutter valves are mounted behind each another in the intake manifolds. The flutter valves cause, as a result of the improved thorough blending achieved by them, also a substantially improved combustion of the mixture, so that injurious exhaust gases are extensively eliminated. Furthermore, also the performance of the motor is raised.

In order finally to achieve the stoichiometrical equilibrium over the entire rotating speed range and driving range, respectively, of the motor, in cooperative addition to the other measures which have already been taken, the fuel outlet from the nozzle must be regulatable. Suitable for this is a carburettor 28 with nozzle 29 and carburettor pin 30, respectively, which pin 30 is displaceable in the axial direction X-X of the carburettor (note FIG. 7) and operatively connected to an accelerator pedal 30a and controlled by the driver, which pin 30 at its lower end is guided in the conically tapered nozzle opening, and is preferably formed conically, tapering toward the free pin end. With this, the bottom fuel outlet opening 31 of the nozzle opening is selected so small that with full load, the correct air-gas mixture is present, so that with variations of the rotating speed downwardly, corresponding to the correct mixture proportion, the nozzle opening is also correspondingly constricted by means of the conical nozzle pin.

For the extensive or substantial unstressing of the heated cylinder head, which already is cooled additionally by means of water or air not only on the inlet side but also on the outlet side, in accordance with the invention, only the outlet side is to be cooled more. In this manner, the high temperature of the outlet side is reduced to a tolerable degree, whereby extensive care has been provided for unstressing and retaining the shape of the surface of the cylinder head.

By the previously described measures with a multi-cylinder internal combustion engine with at least one carburettor, it is now possible without more, to use a fuel with still little lead content and a completely low octane number, with a constant or yet higher efficiency for the operation than exists with the present high octane fuels. This is understandable in that the high octane fuel requires a high combustion temperature for the combustion of the hydrocarbon parts in the exhaust gases, which with the conventional internal combustion engines, however, already is present with low compression.

In accordance with the invention the internal combustion engine is particularly advantageous with respect to the present time high wear and tear of the valve head, which by the buckling of the cylinder head in the same manner deforms in the annealing condition and finally breaks. Also it is to be pointed out that the initial acceleration of the motor (i.e., when the motor is already running, the ability to start or initially accelerate quickly from a full stop) is increased, since now this is no longer dependent on the speed of the combustion of the fuel. As known, namely the pressure, which originates in the intake manifold with the conventional motors (as described at the outset) is fixed or determined by the speed of the combustion of the mixture. With suppression of the turbulence in the intake manifold by the invention, the stoichiometrical equilibrium can yet then be fully established such that also the starting capability becomes larger over the entire driving range and beyond that the fuel consumption is still small. Yet also the life of the motor is increased in this manner, because the latter now can no longer become too hot and the danger of the breaking of the oil film on the inner surface of the cylinder is substantially prevented.

Tests which have been undertaken have shown that the motor with a compression of 1:12.5 only clinks or bangs if the mixture in the intake manifold is enriched or concentrated, from which the conclusion is to be drawn that as a consequence of the leaking inlet valve, no spontaneous, ignition or combustion can arise. With the enrichment there arises yet an impotent combustion, that is, that the period of time of the stroke does not suffice in order to quench the ignited mixture, so that with the succeeding ignition of the fresh fed-in mixture, the pressure waves which are created, dashing and recoiling against each other in opposition, effect a disadvantageous, and consequently inferior and reduced performance of the engine. For that reason, with a smaller stroke motor, a banging is also unavoidable. On the other hand, a spontaneous ignition or combustion, and consequently, a mutually disadvantageous influence by pressure waves of different ignitions, as previously set forth, is prevented with sealed valves. This is confirmed finally in that a conventional motor only bangs if the internal combustion engine is regulated to advanced ignition or sparking. It appears in this connection indeed unlogical, because with the advanced sparking the compression is still very low, so that also high temperature can not be attained. Hereby, also a photographic illustration of the Firma G.M.C. (General Motors Corp) of the combustion process in an internal combustion engine should be mentioned, from which it is perfectly demonstrated that the burning parts constantly are drawn towards the inlet valve.

A further concrete embodiment of an inlet valve, which substantially completely is self-sealing with extremely large distortion of the valve seat and the valve head support, respectively (as previously described), is still referred to in the following. A sealing bell covers the valve head, which sealing bell is pivotally connected with the valve head, completely covering the latter, and which is supported with its lower edge in the closing position of the valve on the valve head support surface and the valve seat, respectively.

An inlet valve 32 of an internal combustion engine shown in FIG. 8 comprises essentially a valve head 33 with a valve plunger 34 and a valve seat 35. A sealing bell 36 is provided over the valve head 33, which sealing bell 36 is connected with the valve head 33, covering the valve head all around. In addition to this, an opening 37 is provided in the center of the sealing bell 36 and a locking pin is provided in the center of the valve head 33. The sealing bell is pushed with its opening 37 on the locking pin and is secured on the locking pin with a locking nut 38 screwed on the free end of the locking pin which is equipped with threading. With the present embodiment, the locking pin comprises a wider lower part 39 and a narrower upper part 40 constituting a threaded pin and running out toward the upper free end. The part 40 is equipped with the previously mentioned threading for the nut 38. The upper end of the wider lower part 39 forms a support shoulder on which there is supported the part of the sealing bell 36 which closely surrounds the opening 37, so that the sealing bell can adjust to the rising and lowering movements of the valve head 33, according to circumstances how tightly the locking pin 38 is screwed on, and thus is pressed on the shoulder, thus from being completely screwed on to a certain articulated connection on the upper part, and indeed if the nut is not entirely tightened. It is also possible to insert a sealing shim between the lower surface of the sealing bell and the shoulder. The lower part 39 is in this case so high that with the closing position of the valve, the sealing bell 36 is pressed with its lower edge 41 by a compression pressure (in the direction of the arrows X) in the inside of a cylinder on a valve head support surface 42, and in this case, the valve head, besides completely sealing itself, supports thereon. By the articulated connection of the sealing bell on the locking pin of the previously described type, a slight play space for the support of the lower edge 41 of the sealing bell is possible, even on an, under circumstances, uneven, buckling or warping valve head support 42.

According to another embodiment form, a sealing bell 43 is pivotally connected with the upper surface of the valve head via springs 44. The springs 44 are here fastened with one end on the inner side of the sealing bell 43, and with the other free end on the upper surface 45 of the valve head. In the middle of the upper surface 45 of the valve head there is disposed a holding cone or sealing cone 46, on which there is set, universally pivotally mounted, the sealing bell with a bulge 47 serving as a hanger bearing, which, likewise, is provided in the center of the sealing bell 43. The sealing bell, which is pulled by the spring force of the springs 44 in the direction of the arrow Y, thus in the direction of the valve 5 head, also in the closing position of the valve is pressed by the compression pressure (arrow direction X) with its lower edge 45 on a valve head support surface in the present case on the upper surface of an unburnable material 48 which expands at high temperatures and which is positioned in an annular groove. It is still to be mentioned that the springs 44 serve for the pivotal connection of the sealing bell with the valve head.

By the previously described measures, the complete sealing of particularly an inlet valve for internal combustion engines is guaranteed if the valve head support, and the valve seat, respectively, deform, and the valve part independent from the sealing bell, thus the valve head, is unsealed with respect to its valve seat. This is understandable in that the sealing bell, which is additionally provided with a valve, and connected under circumstances pivotally and thus moveably connected with the valve head, still substantially increases the sealing effect of the valve head in a valve opening.

Suitably the sealing bell may be made of the same material as the valve itself.

For purposes of definition and for avoiding alternate expressions in the claims for clarity, the term "cylinder unit" is defined to mean either a cylinder pair (e.g., I or II of FIGS. 1 and 6, wherein each includes two cylinders, that is I includes the cylinder2 and 3, and II comprises the cylinders 3 and 4) or an individual cylinder (e.g., each of the cylinders 2 or 3 or 4 or 5).

While I have disclosed several embodiments of the invention, it is to be understood that these embodiments are given by example only and not in a limiting sense.

I claim:

1. A multi-cylinder internal combustion engine, some of the cylinders operating in cycle phases displaced relative to each other, comprising
    a plurality of cylinders each having a cylinder head and an inlet valve and an outlet valve, said plurality of cylinders constituting at least two cylinder units,
    one common carburettor means for feeding an air-fuel mixture to all of said plurality of cylinders and centrally disposed relative thereto,
    a common intake manifold having an elongated central portion communicatingly centrally connected to said carburettor means, and said common intake manifold having branched end portions communicating with said elongated central portion and to said plurality of cylinders at said inlet valves, respectively,
    cam control means for opening said inlet valves after closing of said outlet valves, respectively,
    means for operatively completely sealing said inlet valves and said respective cylinders from said intake manifold at inlet sides of said cylinder heads, respectively,
    at least two check valve means in said elongated central portion of said intake manifold operatively coordinated to each of said cylinder units, respectively, said two check valve means being disposed in said elongated central portion of said common intake manifold adjacent to and on opposite sides of said carburettor means, respectively,
    one of said check valve means for automatically opening by means of suction from a first of and said cylinder units coordinated thereto via an opening of said inlet valve of said first cylinder unit, and with another of said check valve means for automatically simultaneously closing when said inlet valve of a coordinated second of said cylinder units operatively with phase displaced cycle relative to that of said first cylinder unit is closed, said one and said another of said check valve means reversing in operation is reversed cycle phases respectively of the coordinated cylinder units and inlet valves, and
    said carburettor means including a nozzle forming a nozzle opening having a bottom fuel outlet, and a carburettor nozzle pin means operatively connected to an accelerator pedal and said nozzle pin means being formed conically on a lower end thereof adjustably axially moveably cooperatively positioned and guided in said nozzle opening for regulating said fuel outlet of said nozzle opening, said nozzle opening and said lower end of said nozzle pin means are cooperatively formed such that at full load, and at each adjustment position of said nozzle pin means relative to said nozzle opening, respectively, the correct air-fuel mixture for the stoichiometrical equilibrium is provided, thereby for providing correct dosed fuel admission into said manifold for stoichiometric equilibrium at each adjustable position.

2. The multi-cylinder internal combustion engine, as set forth in claim 1, wherein
    said lower end of said nozzle pin means is conically formed tapering toward a bottom free end thereof,
    said carburettor means further includes,
    an outer body having an upper larger cylinder and a lower smaller cylinder, the latter is disposed above and is centrally communicatingly connected to said elongated central portion of said intake manifold, said outer body includes a frustoconical portion connecting said upper larger cylinder to said lower smaller cylinder,
    an inner body including an inner upper cylinder concentrically disposed inside and adjacent to said upper larger cylinder of said outer body, said inner body further includes said nozzle, and a frustoconical inner portion connects said inner cylinder to said nozzle,
    said nozzle and said nozzle opening, respectively, are conically shaped narrowing downwardly,
    said lower end of said nozzle pin means is axially adjustably disposed in said nozzle opening, and said nozzle and said lower end of said nozzle pin means are cooperatively tapered such that at all relative positions the correct air-fuel mixture for stoichiometrical equilibrium is provided in cooperation with said check valve means and said inlet valves.

3. The multi-cylinder internal combustion engine, as set forth in claim 1, wherein
    said inlet manifold is subdivided into a plurality of short time-closeable individual spaces by said at least two check valve means for preventing a reverse flow and for closing said individual spaces for a short time, respectively.

4. The multi-cylinder internal combustion engine, as set forth in claim 3, wherein
    said check valve means is a flap valve pivotably mounted at an upper end thereof in said elongated central portion of said inlet manifold.

* * * * *